(12) United States Patent
Benthein et al.

(10) Patent No.: US 10,160,586 B2
(45) Date of Patent: Dec. 25, 2018

(54) PACKAGE FILM WITH BIAXIALLY ORIENTED FILM AND PATTERN CONNECTION LAYER

(71) Applicant: Bemis Company, Inc., Neenah, WI (US)

(72) Inventors: Michael S. Benthein, Neenah, WI (US); Otacilio T. Berbert, Oshkosh, WI (US)

(73) Assignee: Bemis Company, Inc., Neenah, WI (US)

( * ) Notice: Subject to any disclaimer, the term of this patent is extended or adjusted under 35 U.S.C. 154(b) by 394 days.

(21) Appl. No.: 15/170,384

(22) Filed: Jun. 1, 2016

(65) Prior Publication Data
US 2017/0349352 A1 Dec. 7, 2017

(51) Int. Cl.
| | |
|---|---|
| *B65D 81/20* | (2006.01) |
| *B32B 7/14* | (2006.01) |
| *B32B 27/08* | (2006.01) |
| *B32B 27/32* | (2006.01) |
| *B32B 27/34* | (2006.01) |
| *B65D 75/26* | (2006.01) |

(52) U.S. Cl.
CPC ............ *B65D 81/2023* (2013.01); *B32B 7/14* (2013.01); *B32B 27/08* (2013.01); *B32B 27/32* (2013.01); *B32B 27/34* (2013.01); *B65D 75/26* (2013.01); *B32B 2250/24* (2013.01); *B32B 2307/72* (2013.01); *B32B 2439/46* (2013.01)

(58) Field of Classification Search
CPC ...... B65D 81/2023; B65D 75/26; B32B 7/14; B32B 27/08; B32B 27/32; B32B 27/34; B32B 2250/24; B32B 2307/72; B32B 2439/46
See application file for complete search history.

(56) References Cited

U.S. PATENT DOCUMENTS

| | | |
|---|---|---|
| 4,529,641 A | 7/1985 | Holtrop et al. |
| 6,455,138 B1 | 9/2002 | Murano |
| 7,632,370 B2 | 12/2009 | van Driesten |
| 8,202,002 B2 | 6/2012 | McMahon et al. |
| 8,266,873 B2 | 9/2012 | Berbert et al. |
| 8,603,609 B2 | 12/2013 | Fraser et al. |
| 8,945,702 B2 | 2/2015 | Wuest et al. |
| 9,254,061 B2 | 2/2016 | Harl et al. |
| 2004/0254322 A1 | 12/2004 | Trent et al. |
| 2007/0254120 A1 | 11/2007 | Rasmussen |
| 2013/0309375 A1 | 11/2013 | Berbert |
| 2014/0295116 A1 | 10/2014 | Berbert |
| 2015/0132546 A1 | 5/2015 | Cruz et al. |

FOREIGN PATENT DOCUMENTS

WO    WO2015072978 A1    5/2015

*Primary Examiner* — Michael C Miggins
(74) *Attorney, Agent, or Firm* — Christine E. Parsons

(57) ABSTRACT

A package film comprising a biaxially oriented film and pattern connection layer is described. The package film comprises an exterior layer comprising a biaxially oriented film. The biaxially oriented film is a biaxially oriented nylon film or a biaxially oriented polyethylene terephthalate film. The package film also comprises an interior layer comprising a sealant film, and a pattern connection layer positioned between and directly adjacent each of the exterior layer and the interior layer. The pattern connection layer comprises a solvent-based adhesive or a water-based adhesive. The package film has a secant modulus greater than 120,000 psi and an elongation at break of less than 150%. The package film is adapted to form an evacuable storage bag. Various embodiments of the package films are also described.

19 Claims, 11 Drawing Sheets

PACKAGE FILM WITH BIAXIALLY ORIENTED FILM AND PATTERN CONNECTION LAYER

The present application describes a laminated package film with an exterior layer of biaxially oriented film and an interior layer of sealant film, specifically a package film with a pattern connection layer laminating a biaxially oriented nylon film or a biaxially oriented polyethylene terephthalate to a sealant film to provide puncture resistance, tear resistance, heat resistance, and bond strength in an evacutable storage bag.

BACKGROUND

Pattern connection layers in laminated films are used in various packages. For example, US 2013/0309375 (Berbert) discloses a heat-formable, pattern laminated film for thermoforming on a horizontal form-fill-seal machine. WO 2015/072978 (Berbert) discloses a pattern laminated film containing moisturized nylon for chub packaging. US 2015/0132546 (Cruz, et al.) discloses a heat-formable, pattern laminated film comprising a heat-shrinkable film and a non-heat shrinkable film for thermoforming on a horizontal form-fill seal machine. U.S. Pat. No. 8,603,609 (Fraser, et al.) discloses an elastic, formable discontinuously laminated film for trash bags.

Evacutable storage bags need puncture resistance, tear resistance, heat resistance, and bond strength. However, such evacutable storage bags are also generally non-formable.

SUMMARY

Existing laminated films with pattern connection layers do not address the needs for evacutable storage bags. These needs are met by the package film described in the present application. This package film comprises an exterior layer, an interior layer and a pattern connection layer positioned between and directly adjacent (i.e., touching) each of the exterior layer and the interior layer. The exterior layer comprises a biaxially oriented film that comprises a biaxially oriented nylon film or a biaxially oriented polyethylene terephthalate film. Each of the biaxially oriented film and the package film has a secant modulus greater than 120,000 psi and an elongation at break of less than 150%. The interior layer comprises a sealant film. The pattern connection layer comprises a solvent-based adhesive or a water-based adhesive. The package film is adapted to form an evacutable storage bag.

In some embodiments, the biaxially oriented film has a shrinkage value of less than 10% in each of the machine direction and the transverse direction.

In some embodiments, the sealant film may comprise an interior sealant film layer (i.e., the sealant film layer directly adjacent the package contents) comprising ionomer; medium density polyethylene; low density polyethylene; ethylene alpha-olefin copolymer; ethylene vinyl acetate; polypropylene; ethyl methyl acrylate; ethylene methacrylic acid copolymer; ethylene acrylic acid; ethylene normal-butyl acrylate; copolymers of ethylene and ethylenically unsaturated comonomer selected from the group consisting of carboxylic acids and esters, salts and anhydrides of carboxylic acids; or blends of any of the above. The sealant film may comprise at least one non-interior sealant film layer (i.e., a sealant film layer not directly adjacent the package contents) comprising nylon. In some of these embodiments, the sealant film may comprise two non-interior sealant film layers comprising nylon and the two nylon layers may be split (i.e., not directly adjacent or touching). In some embodiments, the sealant film may be free of EVOH.

In some embodiments, the pattern connection layer may have a pattern that is circular, elliptical, oval, square, rectangular, diamond, hexagonal, striped, gridded, or dotted or may have a pattern that is registered.

In some embodiments, the package film may have a PPT value of equal to or greater than 3.5 pound-force or from 3.5 pound-force to 15 pound-force, in accordance with ASTM D2582-16.

In another embodiment, an evacutable storage bag comprises a first package film comprising a first wall of the evacutable storage bag. The first package film comprises a first exterior layer, a first interior layer, and a first pattern connection layer positioned between and directly adjacent (i.e., touching) each of the first exterior layer and the first interior layer. The first exterior layer comprises a first biaxially oriented film that comprises a biaxially oriented nylon film or a biaxially oriented polyethylene terephthalate film. Each of the first biaxially oriented film and the first package film has a secant modulus greater than 120,000 psi and an elongation at break of less than 150%. The first interior layer comprises a first sealant film. The first pattern connection layer comprises a solvent-based adhesive or a water-based adhesive.

The evacutable storage bag also comprises a second package film comprising a second wall of the evacutable storage bag. The second package film comprises a second exterior layer, a second interior layer, and a second pattern connection layer positioned between and directly adjacent each of the second exterior layer and second first interior layer. The second exterior layer comprises a second biaxially oriented film that comprises a biaxially oriented nylon film or a biaxially oriented polyethylene terephthalate film. Each of the second biaxially oriented film and the second package film has a secant modulus greater than 120,000 psi and an elongation at break of less than 150%. The second interior layer comprises a second sealant film. The second pattern connection layer comprises a solvent-based adhesive or a water-based adhesive.

In some embodiments, the evacutable storage bag may also comprise a valve, a resealable component, or a valve and a resealable component.

In some embodiments of the evacutable storage bag, each of the first sealant film and the second sealant film may comprise an interior sealant film layer comprising ionomer; medium density polyethylene; low density polyethylene; ethylene alpha-olefin copolymer, ethylene vinyl acetate; polypropylene; ethyl methyl acrylate; ethylene methacrylic acid copolymer ethylene acrylic acid; ethylene normal-butyl acrylate; copolymers of ethylene and ethylenically unsaturated comonomer selected from the group consisting of carboxylic acids and esters, salts and anhydrides of carboxylic acids; or blends of any of the above. In some embodiments, each of the first sealant film and the second sealant film may be free of EVOH.

In some embodiments, each of the first pattern connection layer and the second pattern connection layer may have a pattern that is circular, elliptical, oval, square, rectangular, diamond, hexagonal, striped, gridded, or dotted or may have a pattern that is registered.

In some embodiments, the first biaxially oriented film and the second biaxially oriented film have the same or different composition or the first sealant film and the second sealant film have the same or different composition or the first pattern connection layer and the second pattern connection layer have the same or different pattern.

DETAILED DESCRIPTION

Figure 1:
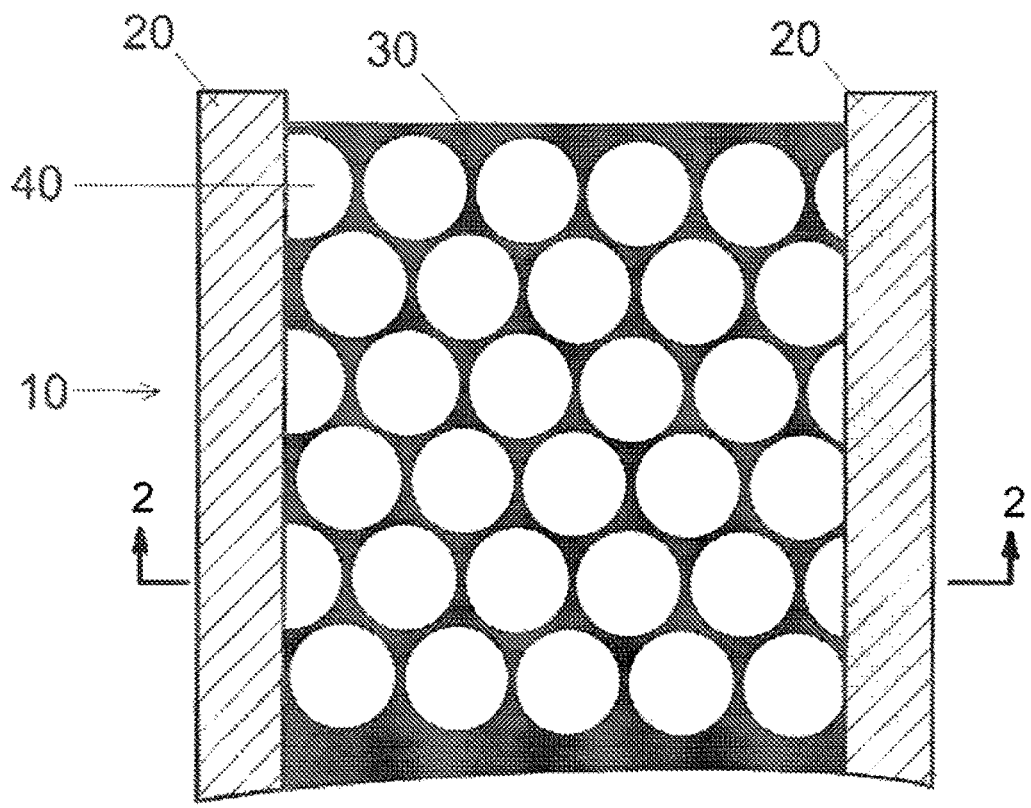
FIG. 1 is a schematic top view of a first embodiment of a package film according to the present application.

As used throughout this application, the term "film" refers to a thermoplastic web of any thickness and is not limited to a thermoplastic web having a thickness of less than 10 mil. The term "sheet" refers to a thermoplastic web of any thickness and is not limited to a thermoplastic web having a thickness of greater than 10 mil. As used throughout this application, the term "thermoplastic" refers to a polymer or polymer mixture that softens when exposed to heat and then returns to its original condition when cooled to room temperature.

As used throughout this application, the term "biaxially oriented film" refers to a thermoplastic web comprising biaxially oriented nylon or a thermoplastic web comprising biaxially oriented polyethylene terephthalate.

As used throughout this application, the term "biaxially oriented nylon film" or "biaxially oriented polyamide film" or "BON film" or "OPA film" or "BOPA film" refers to a thermoplastic web comprising biaxially oriented nylon. A non-limiting example of biaxially oriented nylon film is AMIDROLL® CNF13 and AMIDROLL® CNR03 (each available from Kolon USA, Inc. (Ridgefield Park, N.J.)). A further non-limiting example of biaxially oriented nylon film is Capran 1500 (available from Honeywell Performance Materials and Technologies (Morristown, N.J.)), having a reported dimensional stability in the machine direction of 2.0%, a reported dimensional stability in the transverse direction of 1.0%, a reported secant modulus in the machine direction of 250,000-350,000 psi, a reported secant modulus in the transverse direction of 250,000-350,000 psi, a reported elongation at break in the machine direction of 70-90%, and a reported elongation at break in the transverse direction of 70-90%. A still further non-limiting example of biaxially oriented nylon film is Biaxis (BOPA) 15 (available from Sojitz Plastics America Inc. (Schaumburg, Ill.)), having a reported dimensional stability in the machine direction of less than 2.5%, a reported dimensional stability in the transverse direction of less than 1.5%, a reported elongation at break in the machine direction of 90-150%, and a reported elongation at break in the transverse direction of 70-130%.

As used throughout this application, the term "biaxially oriented polyethylene terephthalate film" or "biaxially oriented polyester" or "OPET film" or "BOPET film" refers to a thermoplastic web comprising biaxially oriented polyethylene terephthalate. A non-limiting example of biaxially oriented polyethylene terephthalate film is Sarafil® TFC 12my (available from Polyplex (USA) LLC (Decatur, Ala.)), having a reported elongation at break in the machine direction of 130%, a reported elongation at break in the transverse direction of 125%, a shrinkage value in the machine direction of 2.0%, and a shrinkage value in the transverse direction of 0.2%. A further non-limiting example of biaxially oriented polyethylene terephthalate film is Skyrol SP65 (48 ga) (available from SKC, Inc. (Covington, Ga.)), having a reported elongation at break in the machine direction of 110%, a reported elongation at break in the transverse direction of 115%, a reported shrinkage value in the machine direction of 2.0%, and a reported shrinkage value in the transverse direction of 0.6%. A still further non-limiting example of biaxially oriented polyethylene terephthalate film is Flexpet™ F-PAP-12 (available from FlexFilms (USA) Inc. (Elizabethtown, Ky.)), having a reported elongation at break in the machine direction of 105%, a reported elongation at break in the transverse direction of 85%, a reported linear shrinkage (maximum) in the machine direction of 3.0%, and a reported linear shrinkage (maximum) in the transverse direction of 1.0%.

As used throughout this application, the term "non-formable" refers to a material that cannot be significantly formed in a thermoforming process without the process causing the material to break. A non-formable material has a secant modulus greater than 120,000 psi and an elongation at break of less than 150%. As such, a non-formable material has characteristics similar to some heat-set oriented materials.

As used throughout this application, the term "interior" refers to a relative position closer to the innermost surface of a film, sheet, web, package or other article. The term "exterior" refers to a relative position closer to the outermost surface of a film, sheet, web, package or other article. Accordingly, the term "interior layer" refers to a layer comprising the innermost surface of a film, sheet, package (e.g., bag), or other article. The term "exterior layer" refers to a layer comprising the outermost surface of a film, sheet, package (e.g., bag) or other article. Additionally, the exterior layer and the interior layer each have an inner surface and an outer surface. The term "inner surface" refers to a surface touching another layer, and the term "outer surface" refers to a surface not touching another layer.

As used throughout this application, the term "sealant film" refers to a film included in a package film and involved in the sealing of the package film to itself or to another layer of another film, sheet, etc. The term "sealant layer" refers to the specific layer of the sealant film involved in the sealing to itself or to another layer. A sealant film may be monolayer or multilayer. If the sealant film is monolayer, the sealant film is synonymous with the sealant layer. If the sealant film is multilayer layer, the sealant film comprises a sealant layer as the interior layer of the sealant film. As used throughout this application, the term "interior layer of the sealant film" refers to the layer of the sealant film that is closer to the innermost surface of a film, sheet, web, package or other article; it is the layer of the sealant film directly adjacent package contents.

As used throughout this application, the term "pattern connection layer" refers to a layer of adhesive between two layers that includes a portion or portions of the area but not the entire area between the two layers. As such, in a pattern connection layer, adhesive is applied to only portions of the area between the two layers connected. A "pattern connection layer" is in contrast to a "flood connection layer." As used throughout this application, a "flood connection layer" refers to a layer of adhesive between two layers that includes the entire area between the two layers. As such, in a flood connection layer, adhesive is applied to the entire area between the two layers connected.

As used throughout this application, the term "tie material" or "tie" refers to a polymeric material serving a primary purpose or function of adhering two surfaces to one another, such as the planar surfaces of two film layers. For example, a tie material adheres one film layer surface to another film layer surface or one area of a film layer surface to another area of a film layer surface. Tie material may comprise any polymer, copolymer or blend of polymers having a polar group or any other polymer, homopolymer, copolymer or blend of polymers, including modified and unmodified polymers (such as grafted copolymers) which provide sufficient interlayer adhesion to adjacent layers comprising otherwise non-adhering polymers. Specific non-limiting examples of tie materials are DuPont™ Bynel® 41E710 and DuPont™ Bynel® 41E687 (each available from E.I. du Pont de Nemours and Company, Inc. (Wilmington, Del.)); Plexar® PX3747 and Plexar® PX3227 (each available from LyondellBasell Industries (Houston, Tex.)); Tymax™ GT4157, Tymax™ GT4524, and Tymax™ GT4300 (each available from Westlake Chemical Corporation (Houston, Tex.)); and ADMER® SF755A (available from Mitsui Chemicals America, Inc. (Rye Brook, N.Y.)).

As used throughout this application, the term "adhesive" refers to a specific subset of tie materials. Unless otherwise specifically indicated, an adhesive may have any suitable composition that provides a desired level of adhesion with the one or more surfaces in contact with the adhesive. Adhesives may be solvent-based, water-based (also known as waterborne), or solventless. Solvent-based adhesives include an adhesive and at least one solvent and require the solvent to be removed by evaporation (e.g., drying) after the solvent-based adhesive is applied. Non-limiting examples of solvent-based adhesives include two-part polyurethane adhesives, including but not limited to those with solids content greater than 30 percent by weight. A specific non-limiting example of a solvent based adhesive is a two-part adhesive comprising Liofol® LA PB5210 (a solvent urethane adhesive) and Liofol® LA PB 500-83 (a solvent urethane co-reactant), having a solids content of 40 percent by weight (available individually and in combination from Henkel Corporation (Rocky Hill, Conn.)). A further specific non-limiting example of a solvent-based adhesive is a two-part adhesive comprising ADCOTE™ 536A (adhesive) and ADCOTE™ 536B (co-reactant), having a solids content of 40 percent by weight (available individually and in combination from The Dow Chemical Company (Midland, Mich.)). A specific non-limiting example of a water-based adhesive is Robond™ L-148/CR 9-101, a two-component waterborne adhesive including co-reactant (available from The Dow Chemical Company (Midland, Mich.)). Specific non-limiting examples of solventless adhesives are the Liofol® LA 1139 series of adhesives, including but not limited to Liofol® LA 1139-04 and Liofol® LA1139-81B (available from Henkel Corporation (Rocky Hill, Conn.)).

As used throughout this application, the term "copolymer" refers to a polymer product obtained by the polymerization reaction or copolymerization of at least two monomer species. Copolymers may also be referred to as bipolymers. The term "copolymer" is also inclusive of the polymerization reaction of three, four or more monomer species having reaction products referred to as terpolymers, quaterpolymers, etc.

As used throughout this application, the term "modified" refers to a chemical derivative, such as one having any form of anhydride functionality (e.g., anhydride of maleic acid, crotonic acid, citraconic acid, itaconic acid, fumaric acid, etc.), whether grafted onto a polymer, copolymerized with a polymer or blended with one or more polymers. The term is also inclusive of derivatives of such functionalities, such as acids, esters and metal salts derived from such.

As used throughout this application, the term "secant modulus" refers to an approximation of the elastic modulus or Young's modulus of a film and is the slope of a line from the origin of a curve (zero strain) to a specific strain point of the stress-strain curve. ASTM D882, "Standard Test Method for Tensile Properties of Thin Plastic Sheeting" sets forth procedures for measuring secant modulus of film. In some embodiments, secant modulus may be measured at 1% strain and 2% strain.

As used throughout this application, the term "elongation at break" refers to the extension (i.e., lengthening or stretching) produced by a tensile stress at the moment of rupture of a film. Elongation at break is often expressed as a percentage of the original length of the specimen. ASTM D882, "Standard Test Method for Tensile Properties of Thin Plastic Sheeting" sets forth procedures for measuring elongation at break of film.

As used throughout this application, the term "evacutable storage bag" refers to package in which an end-user may place items (e.g., clothes, household goods, etc.) and remove a majority of the air by vacuum (e.g., connection to a vacuum) or compression (e.g., rolling, flattening, etc.). An evacutable storage bag may comprise a fitment or other valve to allow connection to a vacuum. An evacutable storage bag may be resealable or otherwise recloseable and may comprise a zipper, slider, or other interlocking closure strips, hook and loop fasteners, or other resealable or recloseable component as known in the art.

As used throughout this application, the term "polyethylene" or "PE" refers (unless indicated otherwise) to ethylene homopolymers or copolymers. Such copolymers of ethylene include copolymers of ethylene with at least one alpha-olefin and copolymers of ethylene with other units or groups such as vinyl acetate or otherwise. The term "polyethylene" or "PE" is used without regard to the presence or absence of substituent branch groups. PE includes, for example, medium density polyethylene, high density polyethylene, low density polyethylene, ethylene alpha-olefin copolymer, ethylene vinyl acetate, and blends of such. Various PE's may be recycled as reclaimed PE.

As used throughout this application, the term "high density polyethylene" or "HDPE" refers to both (a) homopolymers of ethylene which have densities from 0.960 g/cm$^3$ to 0.970 g/cm$^3$ and (b) copolymers of ethylene and an alpha-olefin (usually 1-butene or 1-hexene) which have densities from 0.940 g/cm$^3$ to 0.958 g/cm$^3$. HDPE includes polymers made with Ziegler or Phillips type catalysts and polymers made with single-site metallocene catalysts. HDPE also includes high molecular weight "polyethylenes."

As used throughout this application, the term "low density polyethylene" or "LDPE" refers to branched homopolymers having densities from 0.915 g/cm³ to 0.930 g/cm³, as well as copolymers containing polar groups resulting from copolymerization (such as with vinyl acetate or ethyl acrylate). LDPE typically contains long branches off the main chain (often termed "backbone") with alkyl substituents of two to eight carbon atoms. Specific non-limiting examples of LDPE are EG412AA and EC478AA (available from Westlake Chemical Corporation (Houston, Tex.)) and Petrothene® NA963 (available from LyondellBasell Industries (Houston, Tex.)).

As used throughout this application, the terms "copolymer of ethylene and at least one alpha-olefin" or "ethylene alpha-olefin copolymer" refer to a modified or unmodified copolymer produced by the co-polymerization of ethylene and any one or more alpha-olefins. Suitable alpha-olefins include, for example, $C_3$ to $C_{20}$ alpha-olefins such as propene, 1-butene, 1-pentene, 1-hexene, 1-octene, 1-decene and blends of such. Ethylene alpha-olefin copolymers may include, for example, linear low density polyethylene (LLDPE), very low density polyethylene (VLDPE) and ultra low density polyethylene (ULDPE). The co-polymerization of ethylene and an alpha-olefin may be produced by heterogeneous catalysis, such as co-polymerization reactions with Ziegler-Natta catalysis systems, including, for example, metal halides activated by an organometallic catalyst (e.g., titanium chloride) and optionally containing magnesium chloride complexed to trialkyl aluminum. Alternatively, the co-polymerization of ethylene and an alpha-olefin may be produced by homogeneous catalysis, such as co-polymerization reactions with metallocene catalysis systems which include constrained geometry catalysts, (e.g., monocyclopentadienyl transition-metal complexes). Homogeneous catalyzed copolymers of ethylene and alpha-olefin may include modified or unmodified ethylene alpha-olefin copolymers having a long-chain branched (i.e., 8-20 pendant carbons atoms) alpha-olefin co-monomer (commercially available as, for example, Affinity™ from The Dow Chemical Company (Midland, Mich.)), linear copolymers (commercially available as, for example, Tafmer™ from the Mitsui Petrochemical Corporation (Tokyo, Japan)), and modified or unmodified ethylene alpha-olefin copolymers having a short-chain branched (i.e., 3-6 pendant carbons atoms) alpha-olefin co-monomer (commercially available as, for example, Exact™ from ExxonMobil Chemical Company (Houston, Tex.)). Specific non-limiting examples of VLDPE are ATTANE™ NG 4701G (available from The Dow Chemical Company (Midland, Mich.)) and MXSTEN® CV77526 (available from Westlake Chemical Corporation (Houston, Tex.)). Specific non-limiting examples of metallocene-catalyzed VLDPE (mVLDPE) are Exceed™ 1012HA and Exceed™ 3512CB (each available from ExxonMobil Corporation (Houston, Tex.)). Specific non-limiting examples of LLDPE are ExxonMobil™ LLDPE LL 1001.32 and ExxonMobil™ LLDPE LL 6202.19 (each available from ExxonMobil Corporation (Houston, Tex.)); DOWLEX™ 2056G, DOWLEX™ 2045G, and DOWLEX™ 2645G (each available from The Dow Chemical Company (Midland, Mich.)); SC74580 (available from Westlake Chemical Corporation (Houston, Tex.)); and SCLAIR® FP120-A (available Nova Chemicals Corporation (Calgary, Alberta, Canada)). Specific non-limiting examples of metallocene-catalyzed LLDPE (mLLDPE) are Exceed™ 3812, Exceed™ 1018LH, Exact™ 3139, and Exact™ SLP 9523 (each available from ExxonMobil Corporation (Houston, Tex.)).

As used throughout this application, the term "ethylene vinyl acetate" or "EVA" refers to copolymers comprised of repeating units of ethylene and vinyl acetate. Ethylene vinyl acetate copolymers may be represented by the general formula: $[(CH_2-CH_2)_n-(CH_2-CH(COO)(CH_3)]$. The vinyl acetate content may vary from less than 10% to greater than 95% by weight (of total EVA composition). The vinyl acetate content of EVA for packaging applications may vary from 5% to 40% by weight. Specific non-limiting examples of EVA are DuPont™ Elvax® 3135X, having vinyl acetate content of 12% by weight, and DuPont™ Elvax® 3165, having vinyl acetate content of 18% by weight (each available from E.I. du Pont de Nemours and Company, Inc. (Wilmington, Del.)); and Escorene™ Ultra LD 720.01, having vinyl acetate content of 18% by weight, Escorene™ Ultra LD 730.09, having vinyl acetate content of 17.2% by weight, and ExxonMobil™ LDPE LD 306.38, having vinyl acetate content of 5.5% by weight (each available from ExxonMobil Corporation (Houston, Tex.)).

As used throughout this application, the term "polyamide" or "PA" or "nylon" refers to a homopolymer or copolymer having an amide linkage between monomer units and formed by any method known in the art. The amide linkage may be represented by the general formula: $[C(O)-R-C(O)-NH-R'-NH]_n$ where R and R' are the same or different alkyl (or aryl) group. Nylon polymers may be high-temperature, low-temperature or amorphous, as described in, for example, International Publication Number WO 2006/063283. Examples of nylon polymers include but are not limited to nylon 6 (polycaprolactam), nylon 11 (polyundecanolactam), nylon 12 (polyauryllactam), nylon 4,2 (polytetramethylene ethylenediamide), nylon 4,6 (polytetramethylene adipamide), nylon 6,6 (polyhexamethylene adipamide), nylon 6,9 (polyhexamethylene azelamide), nylon 6,10 (polyhexamethylene sebacamide), nylon 6,12 (polyhexamethylene dodecanediamide), nylon 7,7 (polyheptamethylene pimelamide), nylon 8,8 (polyoctamethylene suberamide), nylon 9,9 (polynonamethylene azelamide), nylon 10,9 (polydecamethylene azelamide), and nylon 12,12 (polydodecamethylene dodecanediamide). A specific non-limiting example of nylon 6 is Ultramid® B36 01 (available from BASF Corporation (Wyandotte, Mich.)). A specific non-limiting example of nylon 6,6 is Zytele® 42A NC010 (available from E.I. du Pont de Nemours and Company, Inc. (Wilmington, Del.)). Examples of nylon copolymers include but are not limited to nylon 6,6/6 copolymer (polyhexamethylene adipamide/caprolactam copolymer), nylon 6,6/9 copolymer (polyhexamethylene adipamidelazelamide copolymer), nylon 6/6,6 copolymer (polycaprolactam/hexamethylene adipamide copolymer), nylon 6,2/6,2 copolymer (polyhexamethylene ethylenediamide/hexamethylene ethylenediamide copolymer), and nylon 6,6/6,9/6 copolymer (polyhexamethylene adipamide/hexamethylene azelamide/caprolactam copolymer). A specific non-limiting example of nylon6/6,6 copolymer is Ultramid® C40 L 07 (available from BASF Corporation (Wyandotte, Mich.)). Examples of aromatic nylon polymers (also sometimes referred to as "amorphous polyamide" or "amorphous nylon") include but are not limited to nylon 4,1, nylon 6,I, nylon 6,6/6I copolymer, nylon 6,6/6T copolymer, nylon MXD6 (poly-m-xylylene adipamide), poly-p-xylylene adipamide, nylon 6I/6T copolymer, nylon 6T/6I copolymer, nylon MXDI, nylon 6/MXDT/I copolymer, nylon 6T (polyhexamethylene terephthalamide), nylon 12T (polydodecamethylene terephthalamide), nylon 66T, and nylon 6-3-T (poly(trimethyl hexamethylene terephthalamide). A specific non-limiting example of nylon 6I/6T copolymer is DuPont™ Selar®) PA 3426 (available from E.I. du Pont de Nemours and Company, Inc. (Wilmington, Del.)).

As used throughout this application, the term "polyester" refers to a homopolymer or copolymer having an ester linkage between monomer units. The ester linkage may be represented by the general formula $[O-R-OC(O)-R'-C(O)]_n$, where R and R' are the same or different alkyl (or aryl) group and may generally be formed from the polymerization of dicarboxylic acid and diol monomers. The dicarboxylic acid (including the carboxylic acid moieties) may be linear or aliphatic (e.g., oxalic acid, maleic acid, succinic acid, glutaric acid, adipic acid, pimelic acid, suberic acid, azelaic acid, sebacic acid, and the like) or may be aromatic or alkyl substituted aromatic (e.g., various isomers of phthalic acid, such as paraphthalic acid (or terephthalic acid), isophthalic acid and naphthalic acid). Specific examples of a useful diol include but are not limited to ethylene glycol, propylene glycol, trimethylene glycol, 1,4-butane diol, neopentyl glycol, cyclohexane diol, 2,2,4,4-tetramethyl-1,3-cyclobutanediol, and the like. Polyesters may include a homopolymer or copolymer of alkyl-aromatic esters, including but not limited to polyethylene terephthalate (PET), oriented polyethylene terephthalate (OPET), amorphous polyethylene terephthalate (APET), glycol-modified polyethylene terephthalate (PETG), and polybutylene terephthalate (PBT); a copolymer of terephthalate and isophthalate including but not limited to polyethylene terephthalateisophthalate copolymer, such as isophthalic acid (IPA) (modified polyethylene terephthalate (PETI)); a homopolymer or copolymer of aliphatic esters including but not limited to polylactic acid (PLA); polyhydroxyalkonates including but not limited to polyhydroxypropionate, poly(3-hydroxybutyrate) (PH3B), poly(3-hydroxyvalerate) (PH3V), poly(4-hydroxybutyrate) (PH4B), poly(4-hydroxyvalerate) (PH4V), poly(5-hydroxyvalerate) (PH5V), poly(6-hydroxydodecanoate) (PH6D); and blends of any of these materials.

As used throughout this application, the term "ethylene vinyl alcohol copolymer" or "EVOH" refers to copolymers comprised of repeating units of ethylene and vinyl alcohol. Ethylene vinyl alcohol copolymers may be represented by the general formula: $[(CH_2-CH_2)_n-(CH_2-CH(OH))]_n$. Ethylene vinyl alcohol copolymers may include saponified or hydrolyzed ethylene vinyl acetate copolymers. EVOH refers to a vinyl alcohol copolymer having an ethylene co-monomer and prepared by, for example, hydrolysis of vinyl acetate copolymers or by chemical reactions with vinyl alcohol. Ethylene vinyl alcohol copolymers may comprise from 28 mole percent (or less) to 48 mole percent (or greater) ethylene. Specific non-limiting examples of EVOH are Soarnol™ DT2904R, having 29 mole percent ethylene, Soarnol™ ET3803RB, having 38 mole percent ethylene, and Soarnol™ AT4403, having 44 mole percent ethylene (each available from Soarus LLC (Arlington Heights, Ill.)); and EVAL™ F171B, having 32 mole percent ethylene, and EVAL™ SP, having 38 mole percent ethylene (each available from Kuraray America Inc. (Houston, Tex.)).

As used throughout this application, "ionomer" refers to ionic copolymers formed from an olefin and an ethylenically unsaturated monocarboxylic acid having the carboxylic acid moieties partially or completely neutralized by a metal ion. Suitable metal ions may include, but are not limited to, sodium, potassium, lithium cesium, nickel, and zinc. Suitable carboxylic acid comonomers may include, but are not limited to, ethylene acid copolymers, such as, ethylene methacrylic acid, methylene succinic acid, maleic anhydride, vinyl acetate methacrylic acid, methyl methacrylate methacrylic acid, styrene methacrylic acid, and blends of such. Useful ionomer ethylene/acid copolymer resins may include an olefinic content of at least 50 mole percent based upon the copolymer and a carboxylic acid content of from 5 to 25 mole percent based upon the copolymer.

As used throughout this application, the term "polypropylene" or "PP" refers to a plastomer, homopolymer or copolymer having at least one propylene monomer linkage within the repeating backbone of the polymer. The propylene linkage may be represented by the general formula: $[CH_2-CH(CH_3)]_n$. Such polypropylene may be a polypropylene impact copolymer, a polypropylene random copolymer or a polypropylene homopolymer, may be syndiotactic or isotactic, or may or may not be clarified.

As used throughout this application, the term "processing aids" refers to anti-block agents, slip agents, stabilizing agents, release agents, lubricating agents, anti-oxidants, photo-initiators, primers, colorants, and other additives known to and used by a person of ordinary skill in the art without undue experimentation. The uses of processing aids varies depending on the equipment, materials, desired aesthetics, etc.

As used throughout this application, the term "Puncture-Propagation-Tear" or "PPT" refers to a material's resistance to snagging or, more precisely, a materials resistance to dynamic puncture and propagation of that puncture resulting in a tear. It refers to a material's dynamic tear resistance. PPT may be determined in accordance with ASTM D2582-16 ("Standard Test Method for Puncture-Propagation Tear Resistance of Plastic Film and Thin Sheeting"). The test measures the combined effects of puncture and tear. A weighted carriage with spike is dropped from a height of 508 millimeters. The length of the resulting tear in the material is a measure of the energy the material absorbs in stopping the weighted carriage. PPT values are reported in force, such as Newton or pound-force. A high PPT value generally reflects a material that is more difficult to tear.

As used throughout this application, the term "kinetic COF" refers to the moving resistance of one surface being dragged across another surface. It is the ratio of the force required to move one surface over another to the total force applied normal to those surfaces, once that motion is in progress. Kinetic COF may be determined in accordance with ASTM 01894-14 ("Standard Test Method for Static and Kinetic Coefficients of Friction of Plastic Film and Sheeting"). A low kinetic COF value generally reflects a material that is more "slippery."

As used throughout this application, the term "haze" refers to the scattering of light as it passes through a material. It refers to the specific light-transmitting and wide-angle-light scattering properties of planar sections of a material. Haze may be determined in accordance with ASTM D1003-13 ("Standard Test Method for Haze and Luminous Transmittance of Transparent Plastics"). Haze values are reported in percent. A high haze value generally reflects a material that is more cloudy and less transparent.

As used throughout this application, the term "puncture" refers to the slow rate penetration resistance of a material to a driven probe (e.g., a one-eighth inch diameter hemispherical probe to outside) at room temperature. Puncture may be determined in accordance with ASTM F1306-16 ("Standard Test Method for Slow Rate Penetration Resistance of Flexible Barrier Films and Laminates"). ASTM F1306-16 provides methods for determining the force, energy, and elongation to perforation. For the present application, puncture is considered the force to perforation, i.e., the peak force to break. As such, puncture values are reported in pound-force.

As used throughout this application, the term "Elmendorf Tear" refers to the force to propagate tearing through a length of material after the tear has been initiated, using an Elmendorf-type (pendulum) tearing tester. It is an index of a material's tearing resistance. Elmendorf Tear may be determined in accordance with ASTM D1922-15 ("Standard Test Method for Propagation Tear Resistance of Plastic Film and Thin Sheeting by Pendulum Method"). Elmendorf Tear values are reported as tearing force, such as, in milli-Newtons or gram-force. A high Elmendorf Tear value generally reflects a material that is more difficult to tear.

As used throughout this application, the term "seal strength" refers to the maximum (or peak) force required to separate a series of seals created at different sealing temperatures (at a pressure of 40 psi and a 0.5 second dwell time) between the sealant films (i.e., sealant film to sealant film) of various package films described in the present application. Seal strength may be determined in accordance with ASTM F88-15 ("Standard Test Method for Seal Strength of Flexible Barrier Materials"). Seal strength values may be reported in pounds per inch (or inch-pound). A high seal strength value generally reflects a stronger seal. "Hot seal strength" is a subset of "seal strength" and refers to the seal strength of a seal created at 280° F. and separated at 230° F.

As used through this application, the term "bond strength" or "layer adhesion" refers to the maximum (or peak) force required to separate two layers, e.g., the biaxially oriented film and the sealant film, at a 180° angle at the adhesive interface between the two layers. Bond strength may be determined in accordance with ASTM F904-98(2008) ("Standard Test Method for Comparison of Bond Strength or Ply Adhesion or Similar Laminates Made from Flexible Materials."). Bond strength values may be reported in grams per inch. A high bond strength value generally reflects a stronger bond.

As used throughout this application, the term "shrinkage value" refers to values obtained by measuring unrestrained (or free) shrink of a ten-centimeter square sample immersed in water at 90° C. (or the indicated temperature if different) for five seconds. In such method, four test specimens are cut from a given sample of the film to be tested. The specimens are cut into squares of ten-centimeter length in the machine direction by ten-centimeter length in the transverse direction. Each specimen is completely immersed for five seconds in a 90° C. (or the indicated temperature if different) water bath. The specimen is then removed from the bath and the distance between the ends of the shrunken specimen is measured for both the machine and transverse directions. The difference in the measured distance for the shrunken specimen and the original ten-centimeter side is multiplied by ten to obtain the percent of shrinkage for the specimen in each direction.

As used throughout this application, the term "machine direction" or "MD" refers to the direction of film transport during or after extrusion or film conversion. As used throughout this application, the term "transverse direction" or "TD" refers to the direction perpendicular to the machine direction.

Figure 2:
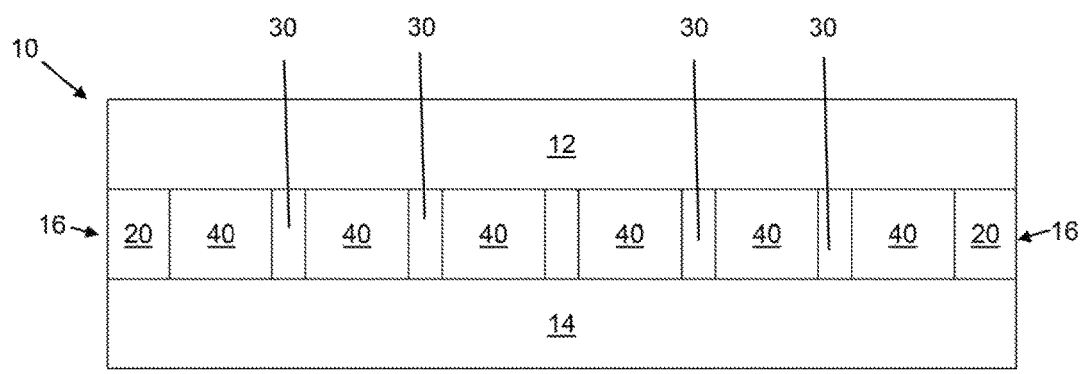
FIG. 2 is a schematic cross-sectional view of the package film of FIG. 1, taken along line 2-2.

Referring now to the drawings, with some but not all embodiments shown, with elements depicted as illustrative and not necessarily to scale, and with the same (or similar) reference numbers denoting the same (or similar) features throughout the drawings, FIG. 1 is a schematic top view of a first embodiment of a package film according to the present application. FIG. 2 is a schematic cross-sectional view of the package film of FIG. 1, taken along line 2-2. Package film 10 comprises exterior layer 12, interior layer 14, and pattern connection layer 16 positioned between and directly adjacent each of exterior layer 12 and interior layer 14. Pattern connection layer 16 comprises lane 20 at each of two opposing edges of package film 10. Pattern connection layer 16 also comprises adhesive 30 and adhesive void 40 alternating across the width of pattern connection layer 16. Lane 20 and adhesive 30 serve to adhere exterior layer 12 and interior layer 14. Adhesive void 40 is an area without adhesive.

Exterior layer 12 comprises a biaxially oriented film. Such biaxially oriented film comprises a biaxially oriented nylon film ("BON film") or a biaxially oriented polyethylene terephthalate film ("OPET film").

The biaxially oriented film of exterior layer 12 has a secant modulus greater than 120,000 psi and an elongation at break of less than 150%. Accordingly, the package film described in the present application has a secant modulus greater than 120,000 psi and an elongation at break of less than 150%. As such, the biaxially oriented film and the package film are each non-formable.

The biaxially oriented film also has a dimensional stability of less than 10% or less than 5% or less than 2% in each of the machine direction and the transverse direction. Similarly, the biaxially oriented film has a shrinkage value of less than 10% or less than 5% or less than 2% in each of the machine direction and transverse direction. As such, the biaxially oriented film (and the resulting package film) are essentially non-heat shrinkable.

Non-limiting specific examples of BON film are described above. Such BON film may be monolayer or multilayer. In some embodiments, the biaxially oriented nylon film may comprise nylon 6 and may be produced by simultaneously biaxially orienting (i.e., one-step orientation) nylon. In other embodiments, the biaxially oriented nylon film may be produced by three-layer coextrusion with a flat cast die and two-step tenter frame orientation. BON film may have a thickness of from 0.25 to 1.0 mil or from 0.32 mil to 1.0 mil or from 0.40 mil to 1.0 mil or from 0.40 mil to 0.80 mil or from 0.40 mil to 0.60 mil or 0.60 mil.

Non-limiting specific examples of OPET film are described above. Such OPET film may be monolayer or multilayer. In some embodiments, the biaxially oriented polyethylene terephthalate film may be made as a single layer. In other embodiments, the biaxially oriented polyethylene terephthalate may be co-extruded with other polymers to form a multilayer film. OPET film may have a thickness of from 0.3 mil to 3.0 mil or from 0.3 mil to 1.5 mil or from 0.5 mil to 2.0 mil or from 0.40 mil to 0.60 mil or from 0.44 mil to 0.48 mil or 0.48 mil.

In various embodiments, the outer surface, the inner surface, both the outer surface and the inner surface, or neither the outer surface nor the inner surface of the biaxially oriented film (i.e., the BON film or the OPET film) may be corona treated.

Interior layer 14 comprises sealant film. The sealant film may be acquired or produced by means known in the art (such as, for example, blown film extrusion or co-extrusion, slot cast extrusion or co-extrusion, lamination, coating, etc.). A sealant film may comprise, but is not limited to including, ionomer, medium density polyethylene; low density polyethylene; ethylene alpha-olefin copolymer; ethylene vinyl acetate; polypropylene; ethyl methyl acrylate; ethylene methacrylic acid copolymer ethylene acrylic acid; ethylene normal-butyl acrylate; copolymers of ethylene and ethylenically unsaturated comonomer selected from the group consisting of carboxylic acids and esters, salts and anhydrides of carboxylic acids; or blends of any of the above. Sealant film may be monolayer or multilayer. In some embodiments, a multilayer sealant film may comprise an interior layer including one or more of the preceding materials and additional, non-interior layers of nylon. In such embodiments, the sealant film may comprise one, two, three or more layers of nylon; multiple layers of nylon may be directly adjacent (i.e., touching) or may be split (i.e., with one or more layers of other material in between). In some embodiments, the sealant film may be free of EVOH. It is believed that, all other aspects of a structure being identical, the presence of EVOH decreases the tear strength and the puncture strength of a package film, resulting in a package film that is more brittle and more easily torn and punctured. The sealant film may have a thickness of from 1.0 mil to 6.0 mil or from 1.0 mil to 4.0 mil or from 1.5 mil to 2.5 mil. In various embodiments, the outer surface, the inner surface, both the outer surface and the inner surface, or neither the outer surface nor the inner surface of the sealant film may be corona treated.

In pattern connection layer 16, lane 20 may comprise the same material as adhesive 30. Such materials including solvent-based adhesives or water-based adhesives. Any solvent-based adhesive or water-based adhesive providing sufficient hot seal strength (i.e., heat resistance) and bond strength during manufacture of an evacutable storage bag may be a component of the pattern connection layer in the various embodiments of the package film described in the present application. The manufacture of an evacutable storage bag may include the heat application of a resealable component (such as a zipper or slider) or the heat application of a valve to connect to a vacuum (such as to evacuate air from the evacutable storage bag). In those embodiments, the adhesive must have sufficient heat resistance and bond strength to withstand such heat.

Due to the pattern application of the adhesive in the various embodiments of the present application, pattern connection layer 16 does not comprise solventless adhesive. The nature and characteristics of solventless adhesive preclude pattern application.

For package film 10, areas of adhesive 30 (i.e., the bonded areas) are visually distinct from areas of adhesive void 40 (i.e., the unbonded areas). The pattern of pattern connection layer 16 may be generally shaped (e.g., circular, elliptical, oval, square, rectangular, diamond, hexagonal, otherwise polygonal, etc.) or generally linear (e.g., striped, gridded, dotted, etc.), and the pattern of pattern connection layer 16 may be registered or unregistered. The pattern of pattern connection layer 16 of package film 10 depicted in FIGS. 1 and 2 is generally circular and unregistered (i.e., repeating throughout or over the entire pattern connection layer). Adhesive 30 is applied to outline a series of repeating circles, with adhesive located between the repeating circles. It is believed that there is a balance between complete lamination between the entire area located between exterior layer 12 and interior layer 14 (which offers less puncture and tear resistance) and such minimal lamination that the two layers are not able to properly form a package film suitable to manufacture an evacutable storage bag.

Figure 3:
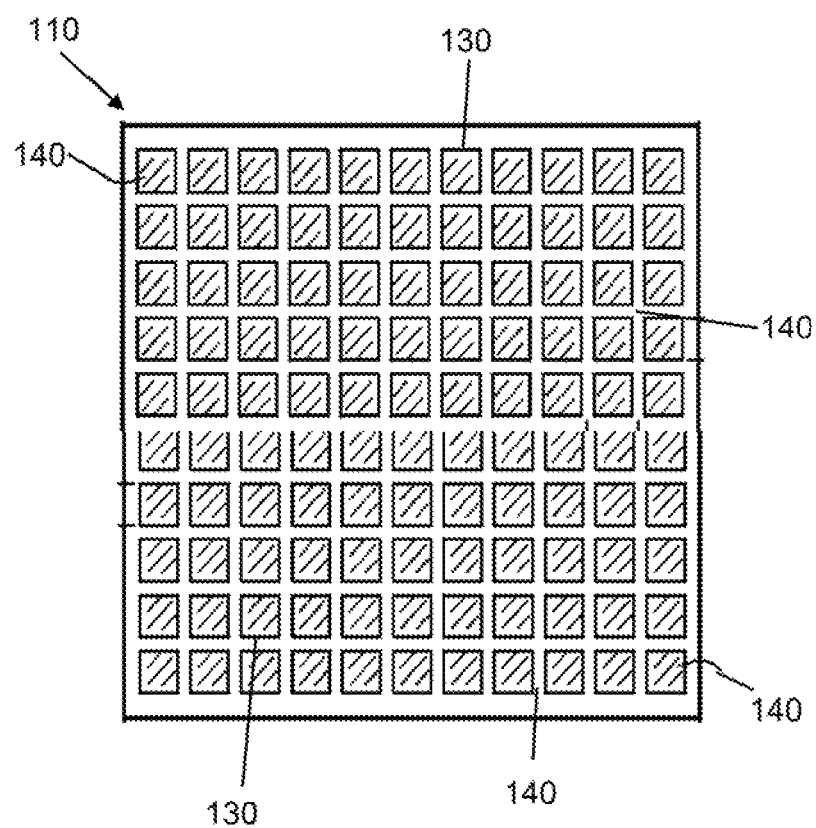
FIG. 3 is a schematic top view of a second embodiment of a package film according to the present application.

FIG. 3 is a schematic top view of a second embodiment of a package film according to the present application. Package film 110 comprises a pattern connection layer with a generally square pattern. Adhesive 130 is applied to outline a series of repeating squares, with adhesive void 140 located within and between the repeating squares.

Figure 4:
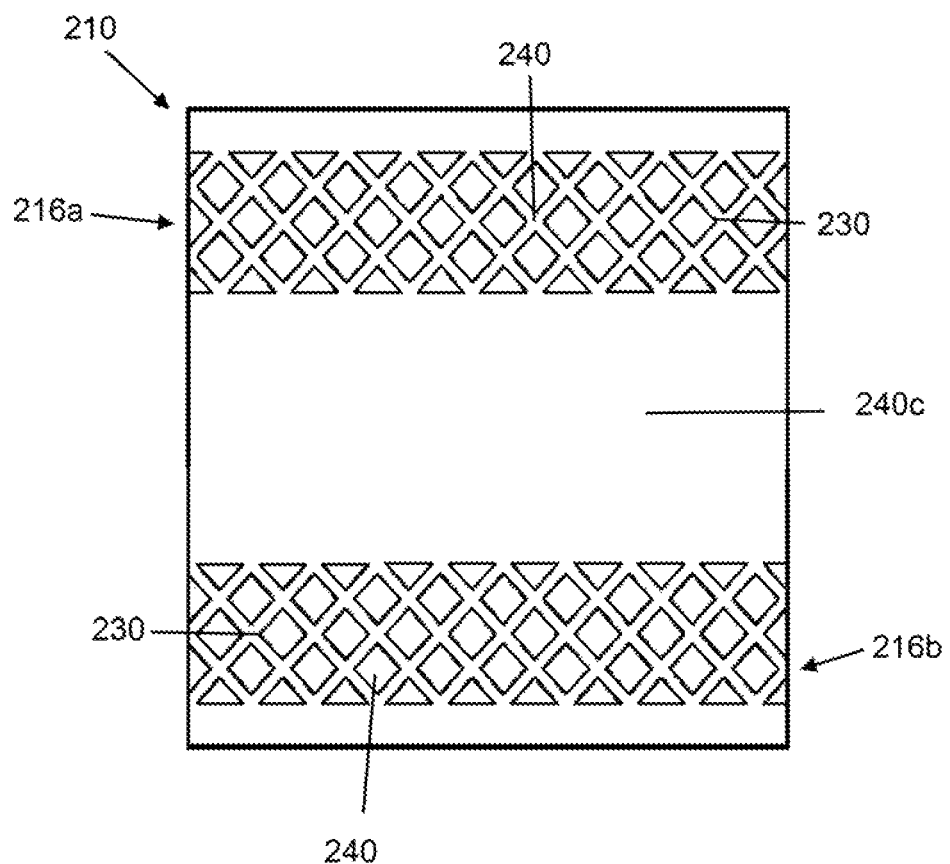
FIG. 4 is a schematic top view of a third embodiment of a package film according to the present application.

FIG. 4 is a schematic top view of a third embodiment of a package film according to the present application. Package film 210 comprises a pattern connection layer with a registered, generally diamond pattern. Adhesive 230 is applied to outline a series of repeating diamonds, with adhesive void 240 located within and between the repeating diamonds. For package film 210, pattern connection layer is applied in register to produce first pattern connection area 216a and second pattern connection area 216b, with a larger adhesive void 240c located between first pattern connection area 216a and second pattern connection area 216b. Such a pattern maximizes the non-laminated area (increasing puncture and tear resistance) and also provides an adhesive area (e.g., second pattern connection area 216b) at which to attach or otherwise apply a fitment or other valve.

Figure 5:
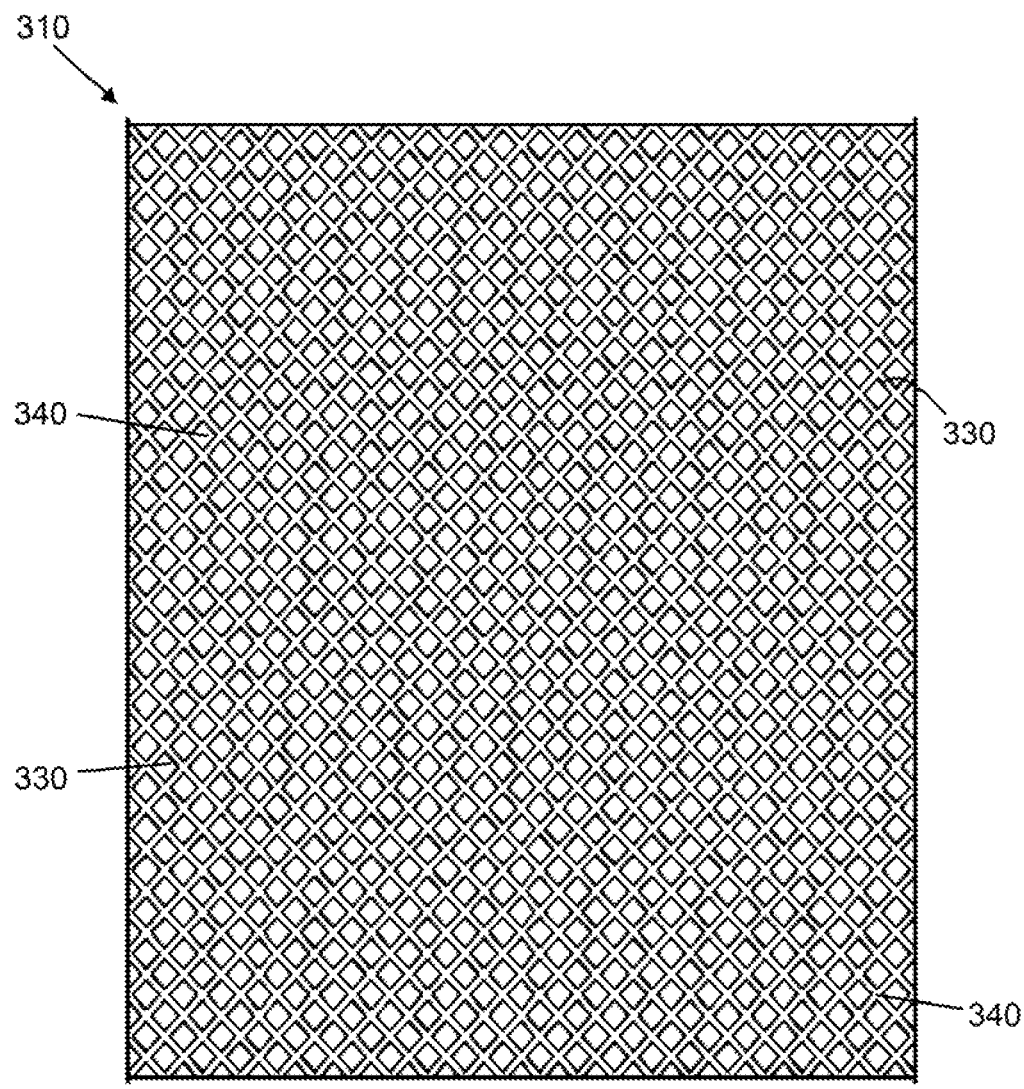
FIG. 5 is a schematic top view of a fourth embodiment of a package film according to the present application.

FIG. 5 is a schematic top view of a fourth embodiment of a package film according to the present application. Package film 310 comprises a pattern connection layer with an unregistered, generally diamond pattern. Adhesive 330 is applied to outline a series of repeating diamonds, with adhesive void 340 located within and between the repeating diamonds.

Figure 6:
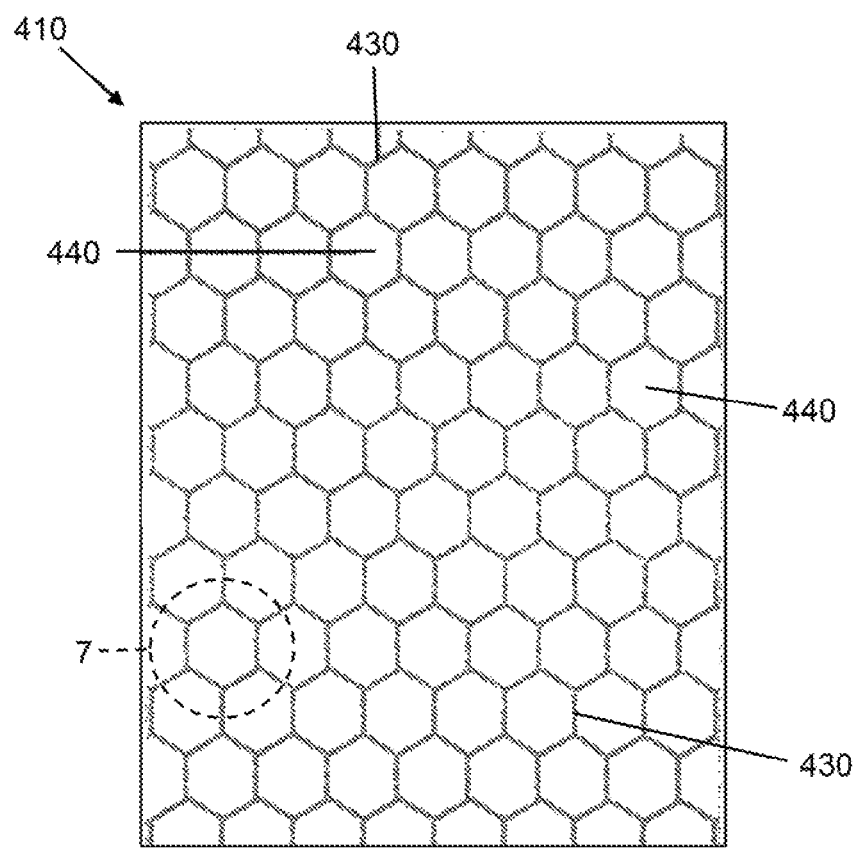
FIG. 6 is a schematic top view of a fifth embodiment of a package film according to the present application
Figure 7:
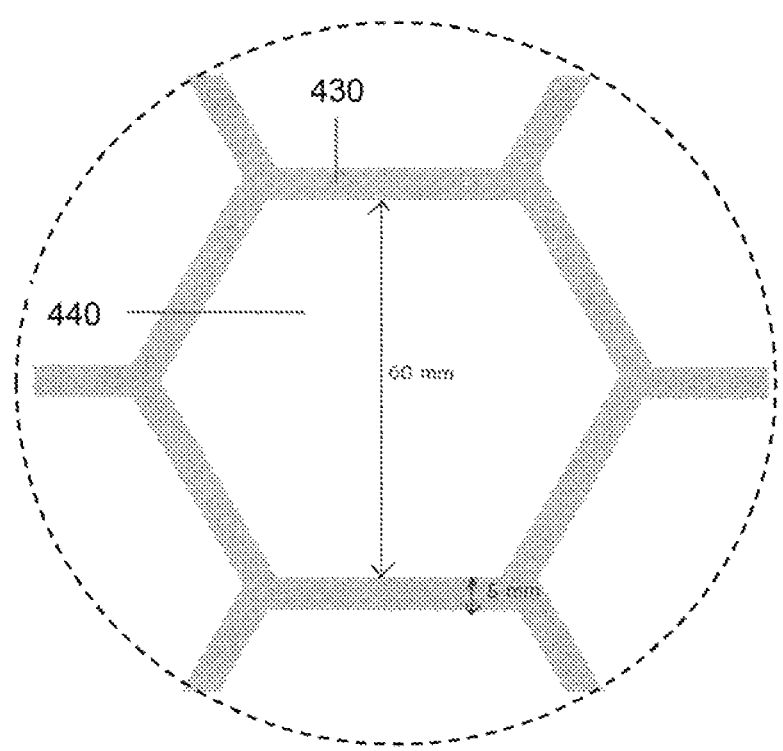
FIG. 7 is a portion of FIG. 6 within the circle "7" enlarged for magnification.

FIG. 6 is a schematic top view of a fifth embodiment of a package film according to the present application. FIG. 7 is a portion of FIG. 6 within the circle "7" enlarged for magnification. Package film 410 comprises a pattern connection layer with a generally honeycomb (i.e., hexagonal) pattern. Adhesive 430 is applied to outline a series of repeating honeycombs, with adhesive void 440 located within the repeating honeycombs. As depicted in FIG. 7, adhesive voids 440 have a diameter of 60 millimeters and a spaced-apart distance of 5 millimeters.

Figure 8:
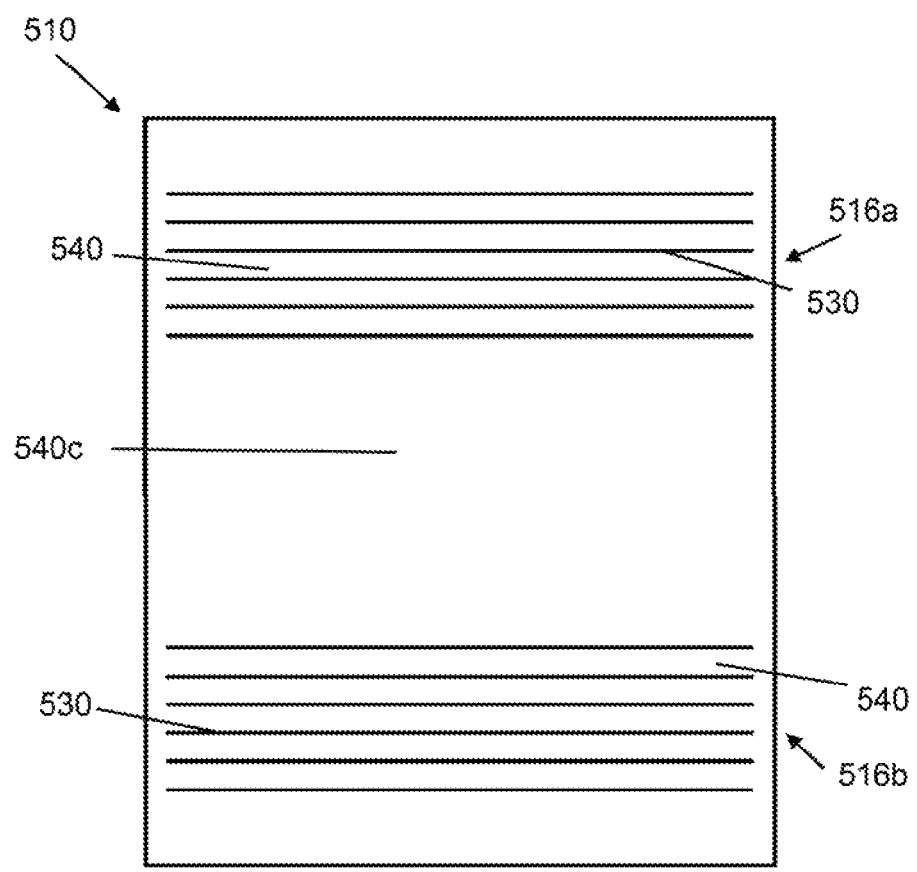
FIG. 8 is a schematic top view of a sixth embodiment of a package film according to the present application.

FIG. 8 is a schematic top view of a sixth embodiment of a package film according to the present application. Package film 510 comprises a pattern connection layer with a registered, generally striped pattern. Adhesive 530 is applied in a series of parallel lines (or stripes), with adhesive void 540 located between the repeating lines. For package film 510, pattern connection layer is applied in register to produce first pattern connection area 516a and second pattern connection area 516b, with a larger adhesive void 540c located between first pattern connection area 516a and second pattern connection area 516b. As described above, such a registered pattern maximizes the non-laminated area (increasing puncture and tear resistance) and also provides an adhesive area (e.g., second pattern connection area 516a) at which to attach or otherwise apply a fitment or other valve.

Figure 9:
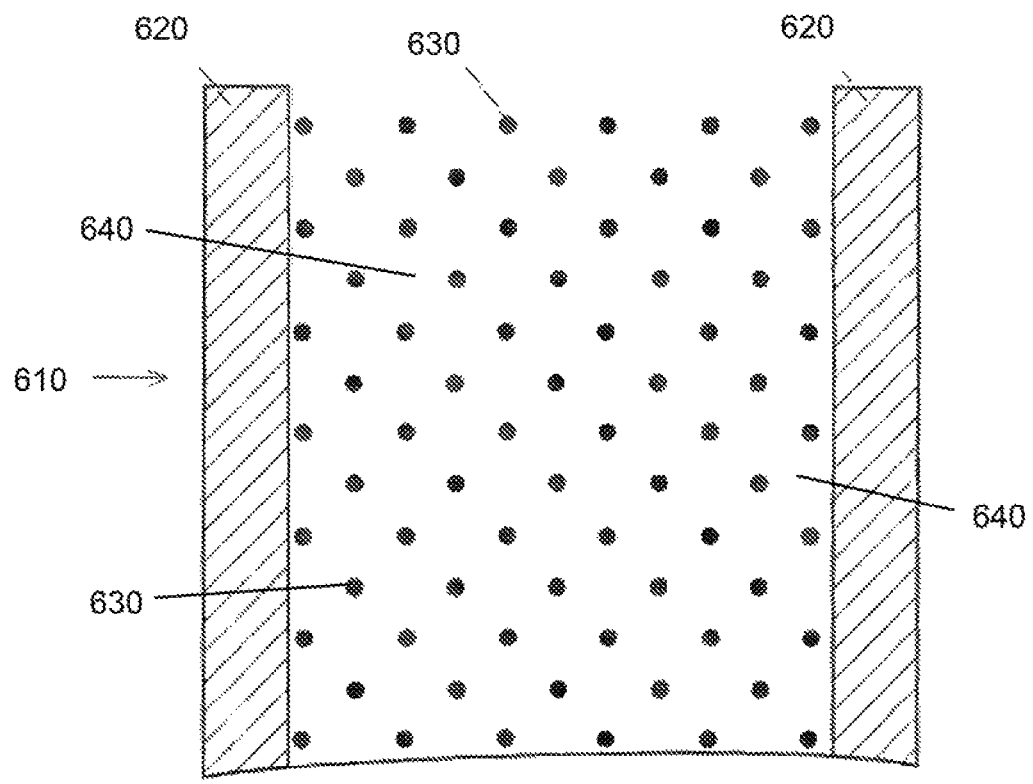
FIG. 9 is a schematic top view of a seventh embodiment of a package film according to the present application.

FIG. 9 is a schematic top view of a seventh embodiment of a package film according to the present application. Package film 610 comprises a pattern connection layer with a generally dotted pattern. Adhesive 630 is applied in a series of dots, with adhesive void 640 located between the dots. Package film 610 also comprises a pattern connection layer with lane 620 at two opposing edges of package film 610. Lane 620 of package film 610 may provide a location at which to securely attach a zipper or other resealable component during the manufacture of an evacutable storage bag with package film 610. Each of lane 620 also adheres the edge of package film 610. Such adhered edges assist in threading package film 610 in and through various packaging machines.

The package film described in the present application may have a PPT value of equal to or greater than 3.5 pound-force or from 3.5 pound-force to 15 pound-force, may have a kinetic COF ratio of from 0.15 to 0.25, may have a haze value of equal to or less than 20% or from 0% to 20%, and may have an Elmendorf Tear value of at least 250 g in each of the machine direction and the transverse direction or of at least 500 g in each of the machine direction and the transverse direction.

A specific non-limiting example of a method of making the package film described in the present application is as follows: A biaxially oriented film (i.e., BON film or OPET film) for the exterior layer is acquired. Separately, a sealant film for the interior layer is produced by blown film coextrusion. And, separately a plate or cylinder is engraved in the pattern of the pattern connection layer. The biaxially oriented film surface to which adhesive will be applied may be corona treated. Ink may be applied to the optionally treated biaxially oriented film surface (if a printed package film is desired). Adhesive is pattern applied (e.g., via flexographic printing with the engraved plate) to the optionally treated biaxially oriented film surface. The sealant film surface to contact the adhesive may be corona treated. The optionally treated sealant film is then laminated to the adhesive and biaxially oriented film. The resulting lamination may be cured at room temperature for twenty-four hours to produce a package film as described in the present application.

Figure 10:
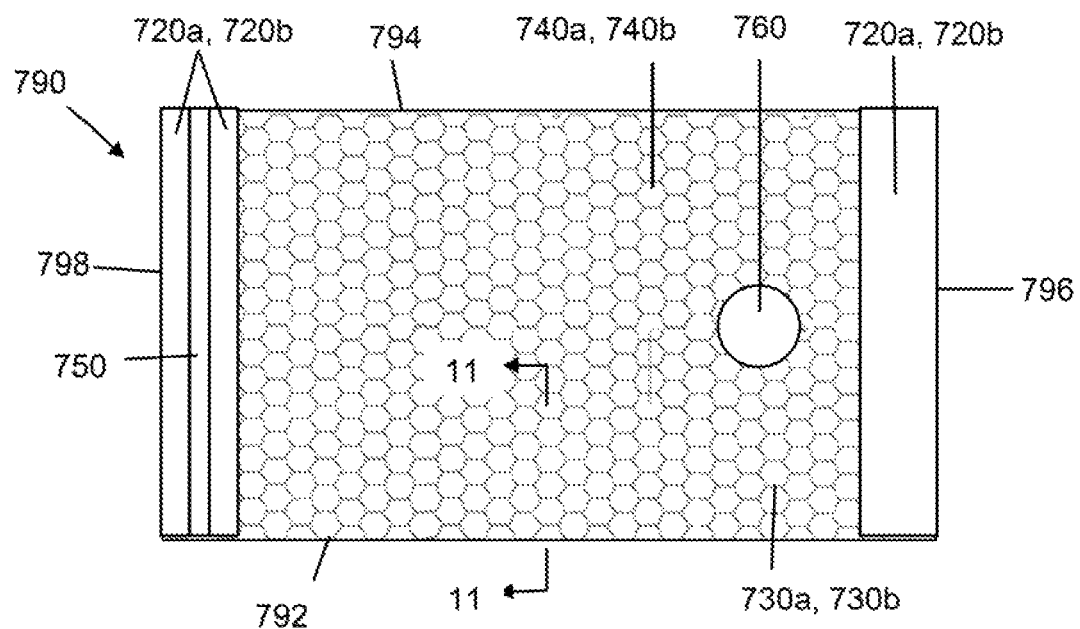
FIG. 10 is a schematic top view of a first embodiment of an evacutable storage bag according to the present application.
Figure 11:
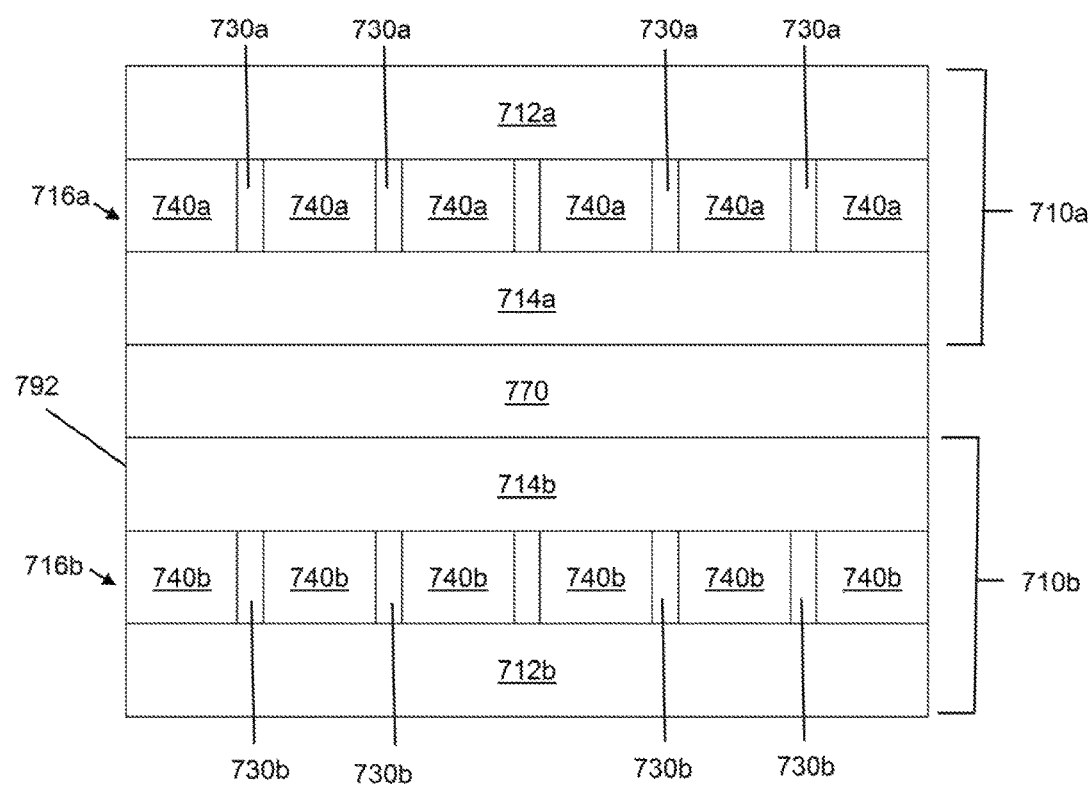
FIG. 11 is a schematic cross-sectional view of the evacutable storage bag of FIG. 10, taken along line 11-11.

FIG. 10 is a schematic top view of a first embodiment of an evacutable storage bag according to the present application. FIG. 11 is a schematic cross-sectional view of the evacutable storage bag of FIG. 10, taken along line 11-11. Evacutable storage bag 790 comprises first edge 792, second edge 794 opposing first edge 792, third edge 796 substantially perpendicular to each of first edge 792 and second edge 794, and fourth edge 798 opposing third edge 796.

Evacutable storage bag 790 further comprises first package film 710a comprising a first wall of evacutable storage bag 790 and second package film 710b comprising an opposing second wall, with product space 770 positioned between first package film 710a and second package film 710b. First package film 710a comprises first exterior layer 712a, first interior layer 714a, and first pattern connection layer 716a positioned between and directly adjacent each of first exterior layer 712a and first interior layer 714a. First pattern connection layer 716a comprises first adhesive 730a and first adhesive void 740a alternating across the width of first pattern connection layer 716a. First adhesive 730a serves to adhere first exterior layer 712a and first interior layer 714a. Second package film 710b comprises second exterior layer 712b, second interior layer 714b, and second pattern connection layer 716b positioned between and directly adjacent each of second exterior layer 712b and second interior layer 714b. Second pattern connection layer 716b comprises second adhesive 730b and second adhesive void 740b alternating across the width of second pattern connection layer 716b. Second adhesive 730b serves to adhere second exterior layer 712b and second interior layer 714b. First adhesive void 740a and second adhesive void 740b are areas without adhesive.

First package film 710a and second package film 710b are further as described above (e.g., in terms of biaxially oriented film composition, sealant film composition, pattern of pattern connection layer, properties, etc.). First package film 710a and second package film 710b may have the same or different composition for first exterior layer 712a and second exterior layer 712b. For example, first exterior layer 712a may comprise biaxially oriented nylon film, while second exterior layer 712b may also comprise biaxially oriented nylon film. First package film 710a and second package film 710b may have the same or different composition for first interior layer 714a and second interior layer 714b. For example, first interior layer 714a may be a multilayer film comprising an interior sealant film layer comprising ethylene alpha-olefin copolymer and no non-interior sealant film layers comprising nylon, while second interior layer 714b may be a multilayer film comprising an interior sealant film comprising ethylene alpha-olefin copolymer and two non-interior sealant film layers comprising nylon, with the two nylon layers split. Additionally, first package film 710a and second package film 710b may have the same or different pattern for first pattern connection layer 716a and second pattern connection layer 716b. For example, first pattern connection layer 716a may have a generally circular pattern, while second pattern connection layer 716b may have a generally honeycomb pattern.

First pattern connection layer 716a comprises first lane 720a at each of two opposing edges of first package film 710a. Similarly, second pattern connection layer 716b comprises second lane 720b at each of two opposing edges of second package film 720b. At each opposing edge, first lane 720a aligns with second lane 720b. The lane 720a, 720b adjacent third edge 796 may assist in reinforcing a heat seal sealing first package film 710a and second package film 710b at third edge 796. The lane 720a, 720b adjacent fourth edge 798 may provide a location at which to securely attach resealable component 750.

First package film 710a and second package film 710b each comprises a pattern connection layer with a generally honeycomb (i.e., hexagonal) pattern. First adhesive 730a and second adhesive 730b are each applied to outline a series of repeating honeycombs, with first adhesive void 740a and second adhesive void 740b located within the repeating honeycombs, respectively. The repeating honeycombs of first package film 710a provide a secure location at which to attach valve 760.

In use, an end-user inserts an item into product space 770 and recloses resealable component 750. The end-user then attaches a vacuum to valve 760 to remove a majority of the air from evacutable storage bag 790. In other embodiments (not depicted), an evacutable storage bag may not include a valve. In such embodiments, an end-user may insert an item into the product space, compress the bag (e.g., by rolling, flattening, etc.) to remove a majority of the air and then redose a resealable component.

EXAMPLES

To exemplify the various embodiments of the present application, several example and comparative example films were produced and evaluated for various properties. TABLE 1 provides information regarding the composition of the various examples and comparative examples.

TABLE 1

|  | Basis weight (lbs/ream) | Composition |
| --- | --- | --- |
| Example 1 | 10.6 | 0.6 mil BON film |
|  | 1.3 | solvent-based adhesive (pattern) |
|  | 29.8 | 2 mil blown sealant film: LLDPE + processing aids/LLDPE + tie/nylon 6/6,6/LLDPE + tie/nylon 6/6,6/LLDPE + tie/mVLDPE + processing aids |
| Example 2 | 10.6 | 0.6 mil BON film |
|  | 1.3 | solvent-based adhesive (pattern) |
|  | 25.0 | 1.75 mil blown sealant film: VLDPE + processing aids/VLDPE + LDPE + LLDPE + processing aids/mVLDPE + processing aids |

TABLE 1-continued

|  | Basis weight (lbs/ream) | Composition |
|---|---|---|
| Comparative Example 1 | 29.8 | 6 mil blown film: nylon 6 + nylon 6I/6T + processing aids/VLDPE + tie/nylon 6 + nylon 6I/6T/EVOH/nylon 6 + nylon 6I/6T/VLDPE + tie/VLDPE + reclaimed PE/VLDPE + LLDPE + processing aids |
|  | 1.3 | solvent-based adhesive (pattern) |
|  | 92.6 | 4 mil sealant film: LLDPE + LDPE + processing aids/VLDPE + tie/nylon 6 + nylon 6I/6T/EVOH/nylon 6 + nylon 6I/6T/VLDPE + tie/LLDPE + LDPE + processing aids |
| Comparative Example 2 | 10.6 | 0.6 mil BON film |
|  | 1.0 | solventless adhesive (flood) |
|  | 29.8 | 2 mil blown sealant film: LLDPE + processing aids/LLDPE + tie/nylon 6/6,6/LLDPE + tie/nylon 6/6,6/LLDPE + tie/mVLDPE + processing aids |
| Comparative Example 3 | 10.6 | 0.6 mil BON film |
|  | 1.3 | water-based adhesive (flood) |
|  | 29.8 | 2 mil blown sealant film: LLDPE + processing aids/LLDPE + tie/nylon 6/6,6/LLDPE + tie/nylon 6/6,6/LLDPE + tie/mVLDPE + processing aids |
| Comparative Example 4 | 10.6 | 0.6 mil BON film |
|  | 1.0 | solventless adhesive (flood) |
|  | 28.7 | 2 mil blown sealant film: VLDPE + processing aids/VLDPE + LDPE + LLDPE + processing aids/mVLDPE + processing aids |
| Comparative Example 5 | 10.6 | 0.6 mil BON film |
|  | 1.5 | solvent-based adhesive (flood) |
|  | 60.6 | 4 mil blown sealant film: LLDPE + VLDPE + processing aids/LLDPE + tie/nylon 6 + nylon 6/6,6/EVOH nylon 6 + nylon 6/6,6/LLDPE + tie/EVA/LLDPE + tie/nylon 6 + nylon 6/6,6/EVOH/nylon 6 + nylon 6/6,6/LLDPE + tie/LLDPE + VLDPE + processing aids |
| Comparative Example 6 | 42.0 | 4 mil blown film: mVLDPE + processing aids/LLDPE + tie/nylon 6 + nylon 6/6,6/EVOH/nylon 6 + nylon 6/6,6/LLDPE + tie/EVA/LLDPE + tie/nylon 6 + nylon 6/6,6/EVOH/nylon 6 + nylon 6/6,6/LLDPE + tie/mVLDPE + processing aids |
| Comparative Example 7 | 41.2 | 2.75 mil blown film: nylon 6,6 + nylon 6 + processing aids/LLDPE + tie/nylon 6/EVOH/nylon 6/LLDPE + tie/VLDPE + LLDPE + processing aids |
| Comparative Example 8 | 42.5 | 2.75 mil blown film (with overprint varnish (OPV)): OPV/nylon 6,6 + nylon 6 + processing aids/LLDPE + tie/nylon 6/LLDPE + tie/nylon 6/LLDPE + tie/VLDPE + LLDPE + processing aids |

Various examples and comparative examples were evaluated via the Puncture-Propagation Tear (PPT) Test. TABLE 2 provides the PPT values (and carriage weight used to determine the values).

TABLE 2

|  | PPT MD (pound-force) | PPT TD (pound-force) | carriage weight (lbs) |
|---|---|---|---|
| Example 1 | 4.09 | 4.70 | 0.25 |
| Comparative Example 2 | 2.18 | 1.98 | 0.25 |
| Comparative Example 3 | 2.57 | 4.05 | 0.25 |
| Comparative Example 4 | 1.18 | 1.00 | 0.13 |
| Comparative Example 5 | 2.38 | 2.56 | 0.25 |
| Comparative Example 6 | 12.67 | 12.75 | 1.0 |
| Comparative Example 7 | 14.01 | 14.01 | 1.0 |

Various examples and comparative examples were evaluated for additional properties. TABLE 3 reports the additional properties.

TABLE 3

|  |  | Kinetic COF (ratio) | Haze (%) | Puncture (pound-force) | Elmendorf Tear (gram-force) | | Seal Strength (lbs/in) | | | | | | | hot seal | Bond Strength (g/in) |
|---|---|---|---|---|---|---|---|---|---|---|---|---|---|---|---|
|  |  |  |  |  | MD | TD | 220° F. | 230° F. | 240° F. | 250° F. | 260° F. | 280° F. | 300° F. | | |
| Example 1 - Unprinted | sealant film to sealant film | 0.17 | | | | | | | | | | | | | 326 |
|  | BON to BON | 0.25 | | | | | | | | | | | | | |
| Example 1 - Printed | sealant film to sealant film | 0.18 | 17.0 | 7.04 | 262 | 234 | 7.71 | 8.64 | 9.88 | 10.30 | 9.25 | | | 6.93 | 458 (no ink area) |
|  | BON to BON | 0.25 | | | 400-gram pendulum | | | | | | | | | | 155 (ink area) |

TABLE 3-continued

| | | Kinetic COF (ratio) | Haze (%) | Puncture (pound-force) | Elmendorf Tear (gram-force) MD | TD | Seal Strength (lbs/in) 220° F. | 230° F. | 240° F. | 250° F. | 260° F. | 280° F. | 300° F. | hot seal | Bond Strength (g/in) |
|---|---|---|---|---|---|---|---|---|---|---|---|---|---|---|---|
| Comparative Example 2 | sealant film to sealant film BON to BON | 0.21 0.37 | 13.8 | 9.14 | 147 | 182 400-gram pendulum | | 5.5 | 7.9 | | 12.3 | 18.2 | 19.7 | 9.19 | 797 |
| Comparative Example 3 | sealant film to sealant film BON to BON | | 15.2 | | 166 | 269 400-gram pendulum | 3.2 | 8.5 | 8.4 | 8.2 | 8.5 | 9.3 | | 3.5 | 438 |
| Comparative Example 7 | sealant film to sealant film nylon to nylon | 0.16 | 8 | | 500 | 2300 3200-gram pendulum | | | | | | | | | |
| Comparative Example 8 | sealant film to sealant film OPV to OPV | 0.28 0.17 | 10 | 3.8 | 1088 | 1780 3200-gram pendulum | | | | | | | | | |

As reported in TABLE 2, Example 1 had the highest PPT values of the adhesive laminated structures (i.e., Example 1, Comparative Example 2, Comparative Example 3, Comparative Example 4, and Comparative Example 5). Comparative Example 6, Comparative Example 7, and Comparative Example 8 were blown films, not adhesive laminated structures, and did not comprise an exterior layer comprising a biaxially oriented film. As such, Comparative Example 6, Comparative Example 7, and Comparative Example 8 (as well as Comparative Example 1) are expected to be more difficult to execute due to, in part, modulus, heat resistance, curl, and COF.

TABLE 3 illustrates, in part, some of the deficiencies of the various comparative examples. For example, the kinetic COF of the exterior layer of Comparative Example 2 was higher than the kinetic COF of the exterior layer of Example 1. As a further example, for the present application a minimum Elmendorf Tear value of at least 250 g is desired. The Elmendorf Tear values for Example 1 generally exceeded this minimum. However, the Elmendorf Tear values for Comparative Example 2 and Comparative Example 3 did not reach this 250 g minimum. Furthermore, as Example 1, Comparative Example 2, and Comparative Example 3 each had the identical sealant film, the ranging seal strength values indicated the impact of the different adhesives (i.e., the solvent-based adhesive of Example 1, the solventless adhesive of Comparative Example 2, and the water-based adhesive of Comparative Example 3). Additionally, the hot seal strength for Example 1 was higher than the hot seal strength for Comparative Example 3, indicating that the heat resistance of the solvent-based adhesive of Example 1 was higher (as desired) than the heat resistance of the water-based adhesive of Comparative Example 3. In this particular instance, due to the hot seal strength (or lack of such) of Comparative Example 3, Comparative Example 3 exhibited heat seal failure during the application of a valve to the evacutable storage bag.

As noted above, other water-based adhesives may provide sufficient hot seal strength (i.e., heat resistance) and bond strength during manufacture of an evacutable storage bag and may be a component of the pattern connection layer in various embodiments of the package film described in the present application.

TABLE 3 further shows the kinetic COF and the haze value of Example 1 were within acceptable ranges for use as an evacutable storage bag, with the acceptable kinetic COF range as 0.15 to 0.25 and the acceptable haze value of equal to or less than 20%. Furthermore, the puncture value and the bond strength value of Example 1 represented the desired mid-point value, compared to Comparative Example 2 and Comparative Example 8 (for puncture value) and compared to Comparative Example 2 and Comparative Example 3 (for bond strength value).

Additionally, while not listed in Table 3, the modulus for Comparative Example 7 was determined to be 92,187 psi in the machine direction and 79,485 psi in the transverse direction, and the modulus for Comparative Example 8 was determined to be 43,000 psi in the machine direction and 40,000 psi in the transverse direction.

Each and every document cited in this present application, including any cross referenced or related patent or application, is incorporated in this present application in its entirety by this reference, unless expressly excluded or otherwise limited. The citation of any document is not an admission that it is prior art with respect to any embodiment disclosed or claimed in this present application or that it alone, or in any combination with any other reference or references, teaches, suggests, or discloses any such embodiment. Further, to the extent that any meaning or definition of a term in this present application conflicts with any meaning or definition of the same term in a document incorporated by reference, the meaning or definition assigned to that term in this present application (including the appended claims) governs.

Unless otherwise indicated, all numbers expressing sizes, amounts, ranges, limits, and physical and other properties used in the present application (including the appended claims) are to be understood as being preceded in all instances by the term "about". Accordingly, unless expressly indicated to the contrary, the numerical parameters set forth in the present application (including the appended claims) are approximations that can vary depending on the desired properties sought to be obtained by a person of ordinary skill in the art without undue experimentation using the teachings disclosed in the present application.

As used in the present application (including the appended claims), the singular forms "a," "an," and "the" encompass embodiments having plural referents, unless the context clearly dictates otherwise. As used in the present application (including the appended claims), the term "or" is generally employed in its sense including "and/or," unless the context dearly dictates otherwise.

Spatially related terms, including but not limited to, "lower," "upper," "beneath," "below," "above," "bottom" and "top," if used in the present application (including the appending claims), are used for ease of description to describe spatial relationships of an element(s) to another. Such spatially related terms encompass different orientations of the device in use or operation, in addition to the particular orientations depicted in the figures and described in the present application (including the appended claims). For example, if an object depicted in the figures is turned over or flipped over, elements previously described as below or beneath other elements would then be above those other elements.

The above description, examples and embodiments disclosed are illustrative only and should not be interpreted as limiting. The present invention includes the description, examples, and embodiments disclosed; but it is not limited to such description, examples, or embodiments. The reader should assume that features of one disclosed embodiment can also be applied to all other disclosed embodiments, unless expressly indicated to the contrary. Modifications and other embodiments will be apparent to a person of ordinary skill in the packaging arts, and all such modifications and other embodiments are intended and deemed to be within the scope of the present invention as described in the claims.

What is claimed is as follows:

1. A package film comprising
   an exterior layer comprising a biaxially oriented film, wherein the biaxially oriented film comprises a biaxially oriented nylon film or a biaxially oriented polyethylene terephthalate film, and wherein the biaxially oriented film has a secant modulus greater than 120,000 psi and an elongation at break of less than 150%,
   an interior layer comprising a sealant film, and
   a pattern connection layer positioned between and directly adjacent each of the exterior layer and the interior layer, wherein the pattern connection layer comprises a solvent-based adhesive or a water-based adhesive,
   wherein the package film has a secant modulus greater than 120,000 psi and an elongation at break of less than 150%, and
   wherein the package film is adapted to form an evacutable storage bag.

2. The package film of claim 1, wherein the biaxially oriented film has a shrinkage value of less than 10% in each of the machine direction and the transverse direction.

3. The package film of claim 1, wherein the sealant film comprises an interior sealant film layer comprising ionomer; medium density polyethylene; low density polyethylene; ethylene alpha-olefin copolymer; ethylene vinyl acetate; polypropylene; ethyl methyl acrylate; ethylene methacrylic acid copolymer; ethylene acrylic acid; ethylene normal-butyl acrylate; copolymers of ethylene and ethylenically unsaturated comonomer selected from the group consisting of carboxylic acids and esters, salts and anhydrides of carboxylic acids; or blends thereof.

4. The package film of claim 1, wherein the sealant film comprises at least one non-interior sealant film layer comprising nylon.

5. The package film of claim 1, wherein the sealant film comprises two non-interior sealant film layers comprising nylon and the two nylon layers are split.

6. The package film of claim 1, wherein the sealant film is free of EVOH.

7. The package film of claim 1, wherein the pattern connection layer has a pattern that is circular, elliptical, oval, square, rectangular, diamond, hexagonal, striped, gridded, or dotted.

8. The package film of claim 1, wherein the pattern connection layer has a pattern that is registered.

9. The package film of claim 1, wherein the package film has a PPT value of equal to or greater than 3.5 pound-force, in accordance with ASTM D2582-16.

10. The package film of claim 1, wherein the package film has a PPT value of from 3.5 pound-force to 15 pound-force, in accordance with ASTM 02582-16.

11. An evacutable storage bag comprising
    a first package film comprising a first wall of the evacutable storage bag, wherein the first package film comprises
       a first exterior layer comprising a first biaxially oriented film, wherein the biaxially oriented film comprises a biaxially oriented nylon film or a biaxially oriented polyethylene terephthalate film, and wherein the first biaxially oriented film has a secant modulus greater than 120,000 psi and an elongation at break of less than 150%,
       a first interior layer comprising a first sealant film, and
       a first pattern connection layer positioned between and directly adjacent each of the first exterior layer and the first interior layer, wherein the first pattern connection layer comprises a solvent-based adhesive or a water-based adhesive,
       wherein the first package film has a secant modulus greater than 120,000 psi and an elongation at break of less than 150%; and
    a second page film comprising a second wall of the evacutable storage bag, wherein the second package film comprises
       a second exterior layer comprising a second biaxially oriented film, wherein the second biaxially oriented film comprises a biaxially oriented nylon film or a biaxially oriented polyethylene terephthalate film, and wherein the second biaxially oriented film has a secant modulus greater than 120.000 psi and an elongation at break of less than 150%,
       a second interior layer comprising a second sealant film, and
       a second pattern connection layer positioned between and directly adjacent each of the second exterior layer and the second interior layer, wherein the second pattern connection layer comprises a solvent-based adhesive or a water-based adhesive,
       wherein second first package film has a secant modulus greater than 120,000 psi and an elongation at break of less than 150%.

12. The evacutable storage bag of claim 11, wherein the evacutable storage bag further comprises a valve, a resealable component, or a valve and a resealable component.

13. The evacutable storage bag of claim 11, wherein each of the first sealant film and the second sealant film comprises an interior sealant film layer comprising ionomer; medium density polyethylene; low density polyethylene; ethylene alpha-olefin copolymer; ethylene vinyl acetate; polypropylene; ethyl methyl acrylate; ethylene methacrylic acid copolymer; ethylene acrylic acid; ethylene normal-butyl acrylate; copolymers of ethylene and ethylenically unsaturated comonomer selected from the group consisting of carboxylic acids and esters, salts and anhydrides of carboxylic acids; or blends thereof.

14. The evacutable storage bag of claim 11, wherein each of the first sealant film and the second sealant film is free of EVOH.

15. The evacutable storage bag of claim 11, wherein each of the first pattern connection layer and the second pattern connection layer has a pattern that is circular, elliptical, oval, square, rectangular, diamond, hexagonal, striped, gridded, or dotted.

16. The evacutable storage bag of claim 11, wherein the first pattern connection layer has a pattern that is registered, the second pattern connection layer has a pattern that is registered, or each of the first pattern connection layer and the second pattern connection layer has a pattern that is registered.

17. The evacutable storage bag of claim 11, wherein the first biaxially oriented film and the second biaxially oriented film have the same or different composition.

18. The evacutable storage bag of claim 11, wherein the first sealant film and the second sealant film have the same or different composition.

19. The evacutable storage bag of claim 11, wherein the first pattern connection layer and the second pattern connection layer have the same or different pattern.

\* \* \* \* \*

UNITED STATES PATENT AND TRADEMARK OFFICE
CERTIFICATE OF CORRECTION

PATENT NO. : 10,160,586 B2
APPLICATION NO. : 15/170384
DATED : December 25, 2018
INVENTOR(S) : Michael S. Benthein et al.

It is certified that error appears in the above-identified patent and that said Letters Patent is hereby corrected as shown below:

In the Specification

In Column 2, Lines 51-52, delete "ethylene methacrylic acid copolymer" and insert -- ethylene methacrylic acid copolymer; --, therefor.

In Column 3, Line 54, delete "Capran" and insert -- Capran® --, therefor.

In Column 4, Line 16, delete "Skyrol" and insert -- Skyrol® --, therefor.

In Column 8, Line 3, delete "[(CH$_2$-CH$_2$)$_n$-(CH$_2$-CH(COO)(CH$_3$)]" and insert -- [(CH$_2$-CH$_2$)$_n$-(CH$_2$-CH(COO)(CH$_3$))]$_n$ --, therefor.

In Column 8, Line 41, delete "Zytele®" and insert -- Zytel® --, therefor.

In Column 8, Line 46, delete "adipamidelazelamide" and insert -- adipamide/azelamide --, therefor.

In Column 8, Line 53, delete "nylon6/6,6" and insert -- nylon 6/6,6 --, therefor.

In Column 8, Line 57, delete "nylon 4,1," and insert -- nylon 4,I, --, therefor.

In Column 9, Line 26, delete "terephthalateisophthalate" and insert -- terephthalate/isophthalate --, therefor.

In Column 9, Line 49, delete "Soamol™" and insert -- Soarnol™ --, therefor.

In Column 9, Line 61, delete "lithium cesium" and insert -- lithium, cesium --, therefor.

In Column 10, Line 42, delete "01894-14" and insert -- D1894-14 --, therefor.

In Column 13, Line 12, delete "tom" and insert -- torn --, therefor.

Signed and Sealed this
Third Day of December, 2019

Andrei Iancu
*Director of the United States Patent and Trademark Office*

CERTIFICATE OF CORRECTION (continued)
U.S. Pat. No. 10,160,586 B2

In the Claims

In Column 22, Line 12, in Claim 10, delete "02582-16" and insert -- D2582-16 --, therefor.

In Column 22, Line 42, in Claim 11, delete "120.000" and insert -- 120,000 --, therefor.